United States Patent [19]

Kranzl et al.

[11] 4,330,262

[45] May 18, 1982

[54] WALKING BEAM FURNACE

[75] Inventors: Franz A. Kranzl; Helmut Springer, both of Dusseldorf, Fed. Rep. of Germany

[73] Assignee: Italimpianti Societa' Italiana Impianti p.A., Genoa, Italy

[21] Appl. No.: 166,684

[22] Filed: Jul. 1, 1980

[30] Foreign Application Priority Data

Feb. 7, 1979 [DE] Fed. Rep. of Germany ....... 2926661

[51] Int. Cl.$^3$ ........................ F27D 1/16; B65G 25/00; F27B 9/14

[52] U.S. Cl. ........................................ 432/3; 198/774; 432/122

[58] Field of Search .................... 432/3, 122; 198/774, 198/775, 776

[56] References Cited

U.S. PATENT DOCUMENTS

| | | | |
|---|---|---|---|
| 2,848,206 | 8/1958 | Kniveton | 432/122 |
| 3,666,086 | 5/1972 | Brockmann | 198/774 |
| 4,116,619 | 9/1978 | Beck | 432/122 |

*Primary Examiner*—John J. Camby

*Attorney, Agent, or Firm*—Berman, Aisenberg & Platt

[57] ABSTRACT

The invention relates to a walking beam furnace, the hearth of which consists, at least partially, of longitudinal beams arranged side by side and alternately formed as fixed beams and walking beams. Each walking beam is lifted and lowered with the aid of lifting rollers, which run on ramps. The ramps are prolonged downwards by a longer distance than is required for the working lift of the walking beams. The walking beams are depressed, step by step, into a repair and maintenance plane which lies appreciably below the plane of the hearth, by moving down the lifting rollers into the region of the lower prolongation of the ramps. For this purpose, a lifting rod which connects all the lifting rollers belonging to a walking beam, is connected to an associated actuating cylinder via a pivotally movable perforated arm mounted at a fixed point, the lifting rod being extended piece by piece by means of extension sections and with the aid of a holding device, and being in each case reinserted into a lower hole in the perforated arm.

8 Claims, 16 Drawing Figures

WALKING BEAM FURNACE

BACKGROUND OF THE INVENTION

1. Field of the Invention

The invention relates to a walking beam furnace, the hearth of which consists, at least partially, of longitudinal beams arranged side by side and alternately formed as fixed beams and walking beams, and in which furnace each walking beam can be lifted and lowered by means of lifting rollers which can be moved on ramps.

2. Description of the Prior Art

Repair and maintenance operations on the walking beams and fixed beams of such a walking beam furnace, as is known, for example, from German Pat. No. 1,280,269, can frequently be performed without having to dismantle the walking beams, since the latter are at least partially accessible from above and below. However, in the case of other repair and maintenance operations it is necessary to dismantle the walking beams. This is necessary not only in the event of repairs on the walking beams themselves, but also if the fixed beams have to be reached from the side. These areas are generally inaccessible, even if the walking beams are in their upper or lower working position. Moreover, furnaces of this type possess sand-troughs or water-troughs to seal off the furnace interior from the atmosphere, which are located under the walking beams and are accordingly characterised by very poor accessibility. A walking beam furnace with two systems of mutually parallel walking beams, movable both longitudinally and vertically, is known from Austrian Pat. No. 230,279, in which a walking beam of one system is always adjacent to a walking beam of the other system. The arrangement is here designed in such a way that the walking beams of the two systems push the material to be annealed forward in alternation. To achieve this, the mutually independent drive-mechanisms for lifting and lowering each system and for displacing it in a straight line both in and opposite to the transport direction are coupled together in such a manner that one drive depresses one system below the transport plane and then lifts it again into the transport plane, while the other drive displaces the other system in opposition to the transport direction. The same repair difficulties also exist in the case of this walking beam furnace, as have been cited above with respect to the walking beam furnace known from German Pat. No. 1,280,269.

SUMMARY OF THE INVENTION

The object of the invention is to provide a walking beam furnace, in which the fixed beams, the walking beams and the seals, particularly the sand-troughs and water-troughs, are accessible without further problems during maintenance and repair operations.

According to the invention, this object is achieved in a walking beam furnace of the type initially mentioned, by prolonging the ramps downwards, beyond the length necessary for the working lift of the walking beams, so that the walking beams can be depressed, in stages, into a repair and maintenance plane which is appreciably below the plane of the hearth, by moving the lifting rollers down into the region of this prolongation of the ramps.

With this design, it is possible to depress the walking beams completely, as far as the furnace floor for example, so that they are readily accessible from all sides. Similarly, the seals or the sand-troughs or water-troughs are completely exposed, so that inspection and repair operations can here also be readily carried out. If the walking beams are depressed, the fixed beams are also completely exposed and are accordingly readily accessible from all sides for repair and maintenance operations.

Moving the lifting rollers down on to the lower prolongations of the ramps in order to depress the walking beams into the repair and maintenance plane can be achieved with the aid of any desired devices. In an advantageous further development of the invention, the lifting rod which connects all the lifting rollers belonging to a walking beam is preferably coupled to the associated actuating cylinder via a perforated arm, which is pivotally mounted at a fixed point, and for moving down the lifting rollers in stages on to the prolongations of the ramps, that is to say for depressing the walking beams, this lifting rod can be lengthened piece by piece by means of extension sections and with the aid of a holding device, and can be reinserted into a lower hole in the perforated arm. This design has the advantage of a particularly simple and economic construction. Furthermore, this design entails the advantage that the actuating cylinders can be mounted at fixed positions and need not be designed to be so long as if the depression of the walking beams into the repair and maintenance plane had to take place with the aid of the actuating cylinders alone and with a single stroke of these cylinders.

DETAILED DESCRIPTION OF THE INVENTION

Figure 1:
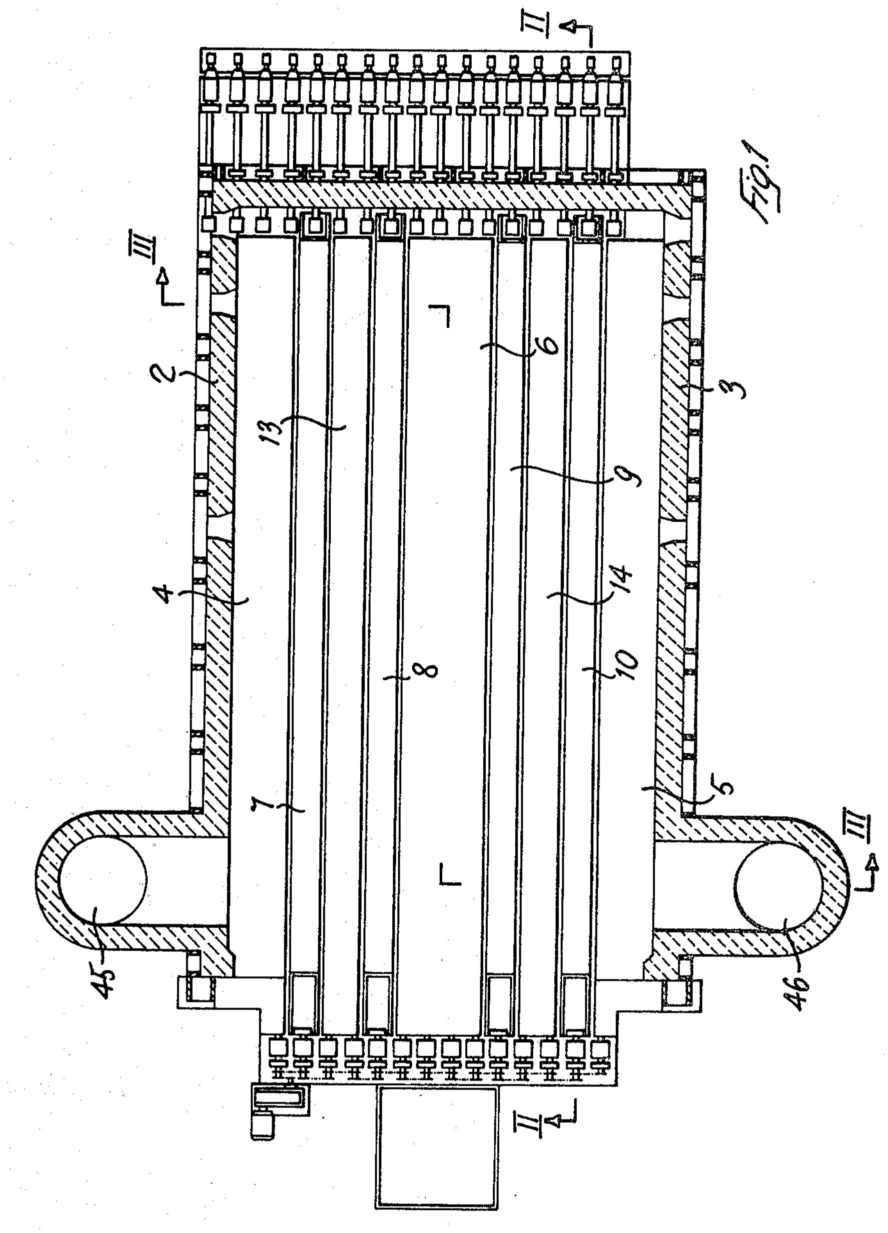
FIG. 1 is a plan view of a walking beam furnace hearth.

The hearth 1 of the walking beam furnace consists of a plurality of beams, extending over the entire length of the furnace hearth, which are alternately formed as fixed beams and walking beams. Relatively wide fixed beams 4, 5 and 6 are located along the two lateral walls 2 and 3 of the furnace, and in the middle of the furnace. The walking beams 7, 8, 9 and 10 lie directly alongside the fixed beams 4, 5 and 6. The walking beams 7 and 8 are connected together via several cross-members 11 and the walking beams 9 and 10 are also connected together via several cross-members 12. A narrower fixed beam 13 lies between the walking beams 7 and 8. Similarly a narrower fixed beam 14 is located on the other side, between the walking beams 9 and 10. The two outer fixed beams 4 and 5 rest on the furnace base 15 and on a framework 16 or 17. The central fixed beam 6 is mounted on the framework 18, which stands erect on the floor 19. The fixed beams 13 and 14 stand on the supports 20 and 21.

On the base 22, a set of ramps is allocated to each pair of walking beams 7, 8, 9, 10. Under the walking beams 9 and 10, the ramps 23 are fitted with tracks 24.

A lifting rod 25, mounted in a manner allowing axial displacement, extends between the ramps 23 and the cross-members 12 beneath the walking beams 9 and 10, on which cross-rods 26 are located, corresponding to the spacing of the ramps. Two pairs of lifting rollers are in each case attached to both the ends of the cross-rods 26, their lower lifting rollers 27 and 28 resting on the tracks 24. Lifting roller pairs 29 and 30 are located above the cross-rods 26, which bear on the tracks 31 and 32 running under the cross-members 12 of the walking beams 9 and 10.

Figure 2:
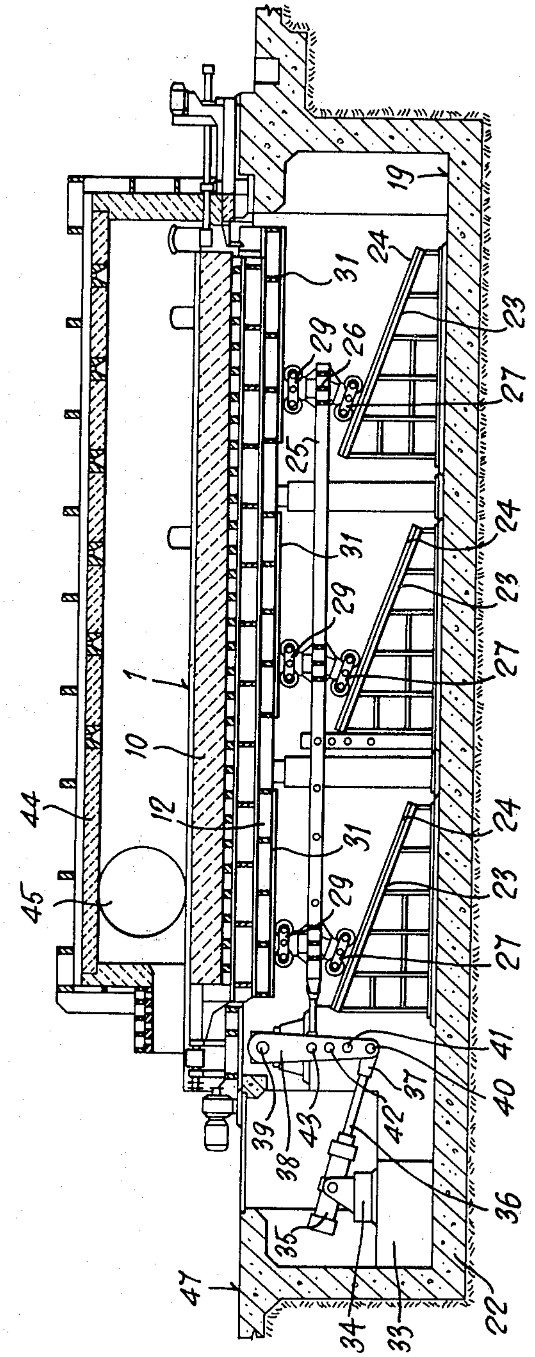
FIG. 2 a longitudinal section through the walking beam furnace along the line II—II of FIG. 1.

At the left-hand end of the walking beam furnace shown in FIG. 2, an actuating cylinder 35 is pivotably mounted on a bearing block 34 which rests on a step 33. The piston rod 36 of the actuating cylinder 35 is pivotably connected, via its head 37, to the outermost hole of a perforated arm 38. The perforated arm 38 is also pivotably mounted in a pivot-bearing 39 and is furnished with four holes or bearings 40, 41, 42 and 43.

By causing the piston rod 36 to move in and out, the lifting rod 25 can be moved backwards and forwards by means of the perforated arm 38, whereby the lower pairs of lifting rollers 27 travel backwards and forwards on the tracks 24, so that the walking beam 10 is concurrently lifted and depressed.

Smoke extraction pipes 45 and 46 exit from both sides of the walking beam furnace, in the zone between the hearth 1 and the furnace roof 44. The plant floor is designated 47.

Figure 4:
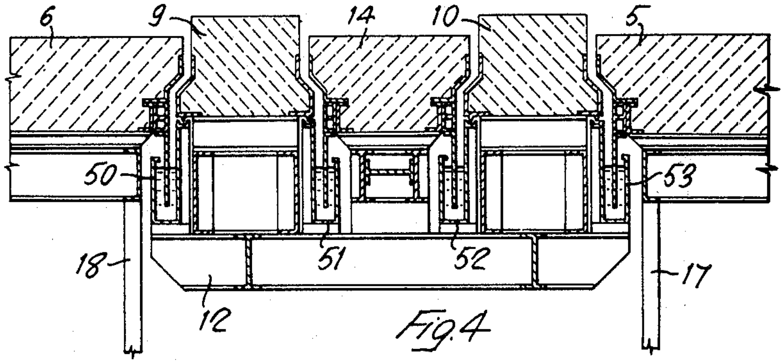
FIG. 4 an enlarged representation of the portion marked A of FIG. 3.
Figure 5:
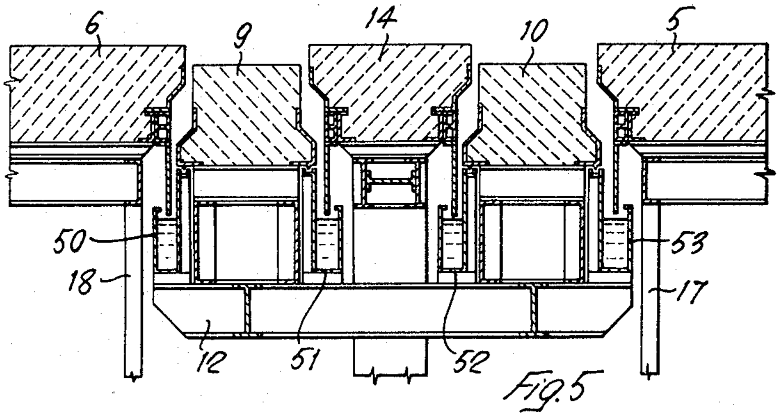
FIG. 5 a representation corresponding to FIG. 4, in which, however, the walking beams are in the lower transport-position.

FIG. 4 shows the upper transport-position of the walking beams 9 and 10, while the lower transport-position of the walking beams 9 and 10 is represented in FIG. 5. In the upper transport-position shown in FIG. 4, the walking beams 9 and 10 carry out the forward push and thus move the material to be annealed away from the furnace entrance towards the furnace exit. For this purpose, it is necessary for the walking beams 9 and 10 to project above the plane of the hearth by a small amount, so that no contact occurs between the material to be annealed and the fixed beams 7, 6 and 9 during transport of the material. After the forward push is completed, the walking beams 9 and 10 are depressed by such an amount that they lie somewhat below the plane of the hearth, so that in this slightly depressed position they can move back into their starting position, without contact of any kind thereby occurring between the walking beams 9 and 10 on the one hand, and the material to be annealed which is resting on the fixed beams 5, 6 and 14 on the other hand.

It can be seen from FIGS. 4 and 5, that merely those repair and maintenance operations are possible, which can be carried out simply from above or below, not only when the walking beams 9 and 10 are in the upper transport-position but also when they are in their lower transport-position. Maintenance operations on those parts which cannot be reached from above or below, especially on the sides of the beams, cannot be performed without further complications. To do this, according to the present state of the art, it would be necessary to dismantle the mobile walking beams 9 and 10 completely and to carry out the repair and maintenance operations outside the furnace. Dismantling procedures of this kind are also necessary when repair and maintenance operations are needed on the fixed beams 5, 6 and 14 or on the sand-troughs or water-troughs 50, 51, 52 and 53, the latter being located immediately below the walking beams.

The difficulties described above always occur when operations have to be carried out on parts which are hidden by others, especially also in instances when work is necessary on the water-troughs 50, 51, 52 and 53.

Figure 3:
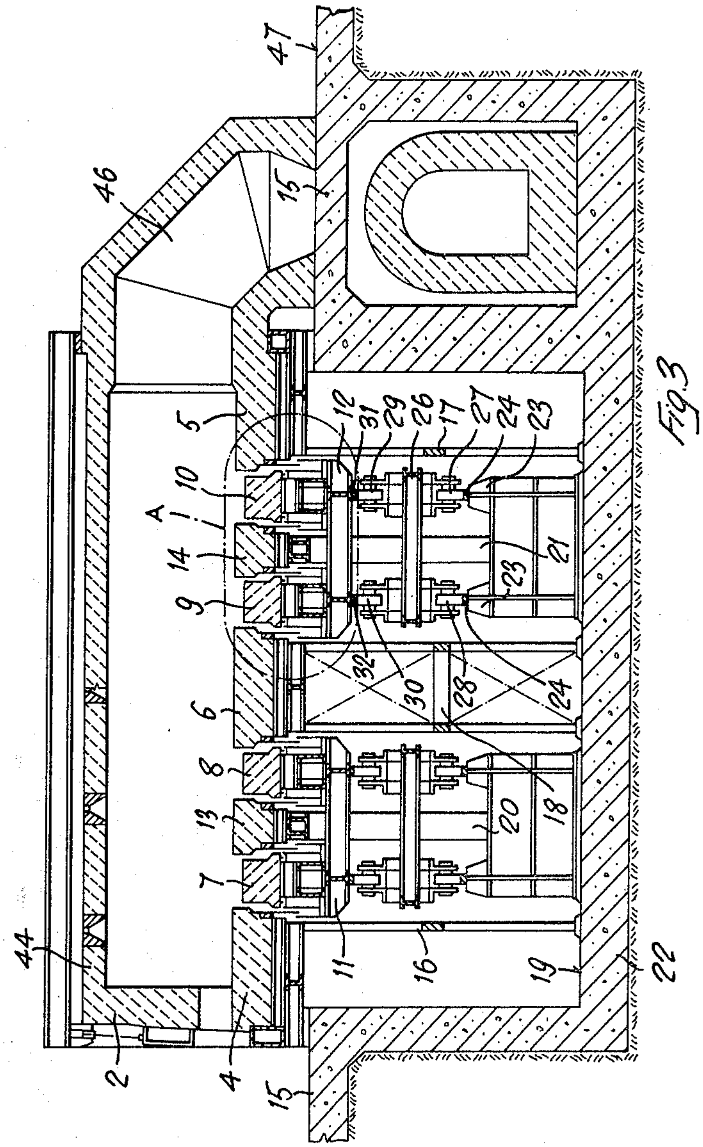
FIG. 3 a cross-section through the walking beam furnace along the line III—III of FIG. 1.
Figure 6:
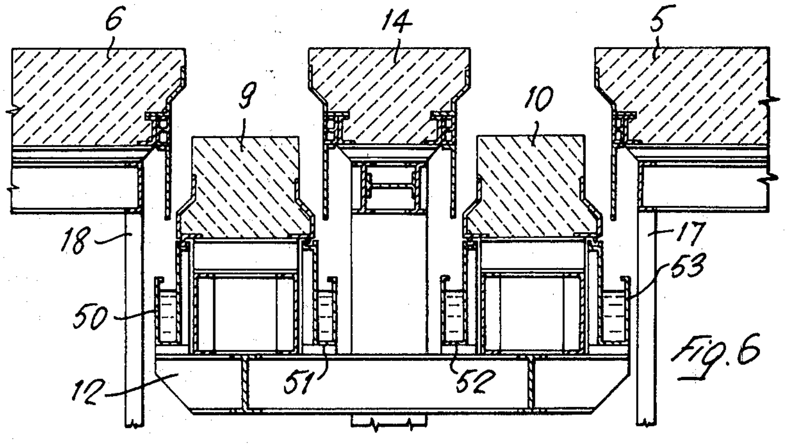
FIG. 6 a representation corresponding to FIG. 4 with the walking beams after the first depression stage.
Figure 7:
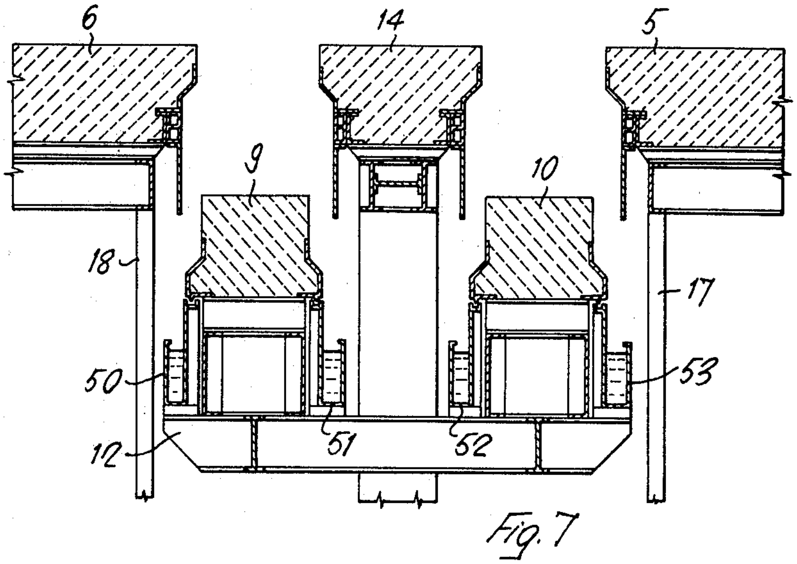
FIG. 7 a representation corresponding to FIG. 4 with the walking beams after the second depression stage.
Figure 8:
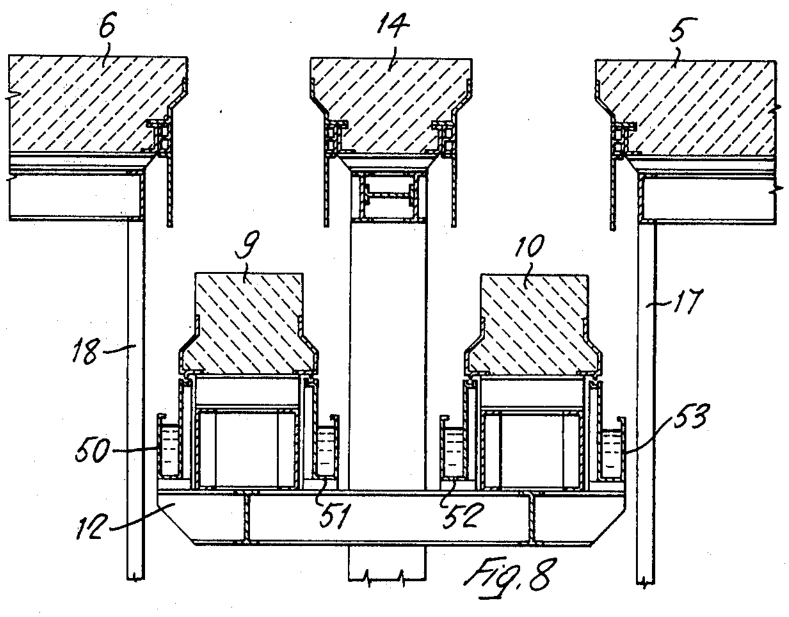
FIG. 8 a representation corresponding to FIG. 4 with the walking beams in the repair and maintenance position.
Figure 9:
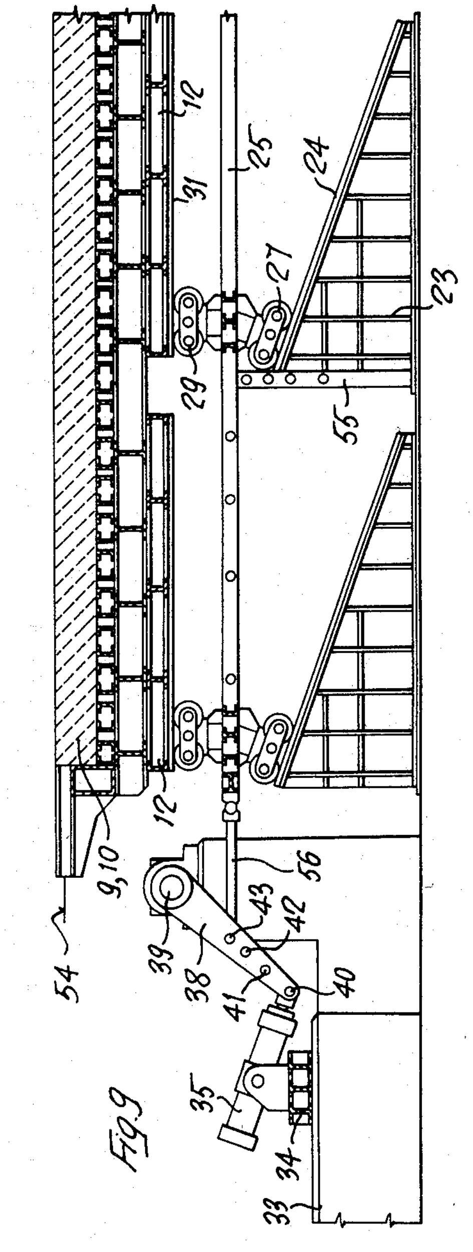
FIG. 9 a side view of the walking beam furnace, corresponding to the left-hand part of FIG. 2.
Figure 10:
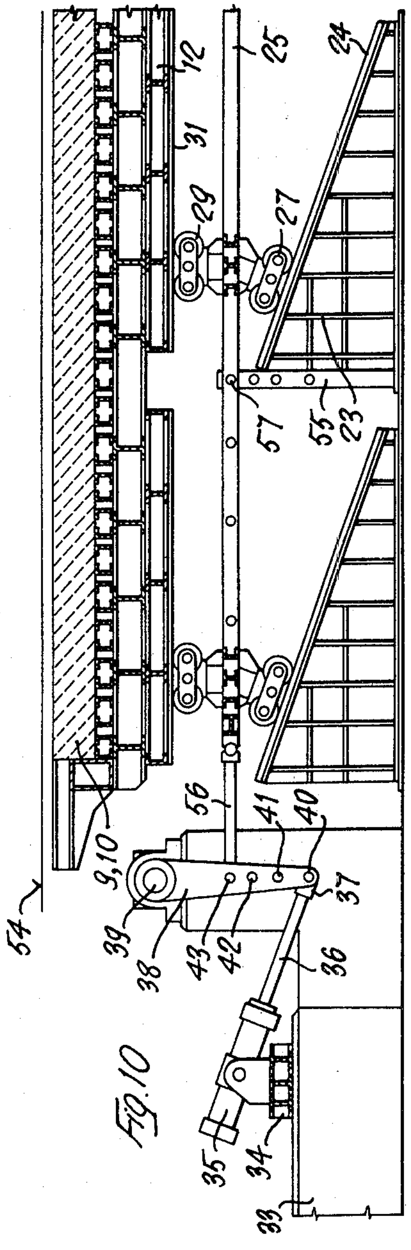
FIG. 10 a representation corresponding to FIG. 9 after the first depression stage of the walking beams.

The portion of FIG. 3 marked A is also shown in FIGS. 6, 7 and 8, however with walking beams at different stages of depression, a first depression stage of the walking beams 9 and 10 being represented in FIG. 6, a second depression stage in FIG. 7 and a final depression stage in FIG. 8, the last being the lower repair and maintenance position. It can be seen, particularly from the representation according to FIG. 8, that the areas of the walking beams 9 and 10 of the fixed beams 5, 6 and 14, which are masked in the working positions according to FIGS. 4 and 5, are accessible without difficulty when the walking beams are in their lowest position. The same also applies to the water-troughs 50, 51, 52 and 53.

The procedure according to the invention is described in the following text by reference to FIGS. 9 to 16. Starting from FIG. 9, in which the walking beams 9 and 10 project by a small amount above the upper edge 54 of the fixed hearth and are accordingly located in the upper working position as per FIG. 4, the piston rod 36 of the actuating cylinder 35, mounted at the pivot joint 45, is extended to the position shown in FIG. 10. At the same time, the lifting rod 25, together with the pairs of lifting rollers 27 and 29, moves some distance obliquely downwards on the track 24 of the ramp 23. In this position, the lifting rod 25 is arrested at the post 55 by means of the accessory rod 56, at the securing point 57. At this stage the accessory rod 56 is detached from the bearing 43 and fitted with an extension 58. This extension is inserted into the bearing 42 of the perforated arm, as can be seen from FIG. 11.

Figure 11:
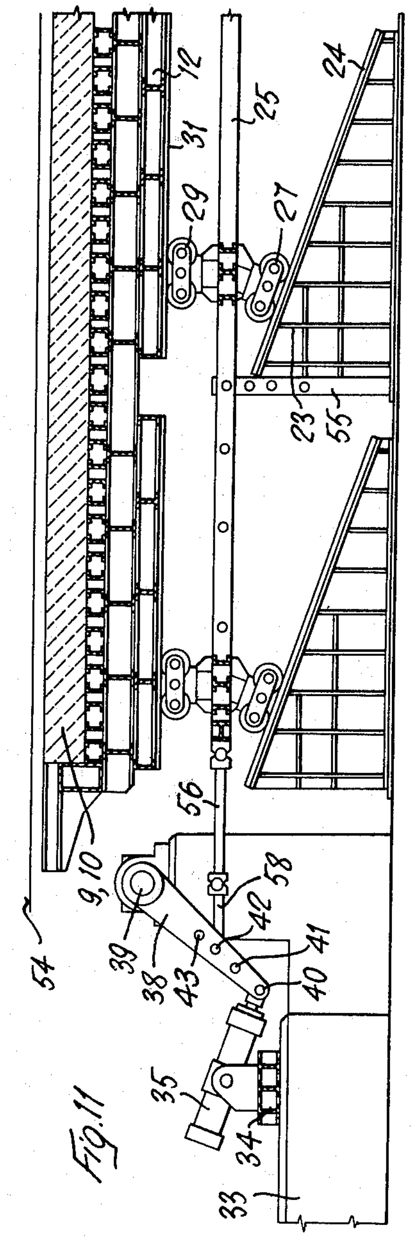
FIG. 11 conditions as per FIG. 10, however with the lifting rod extended and with its point of insertion altered.
Figure 12:
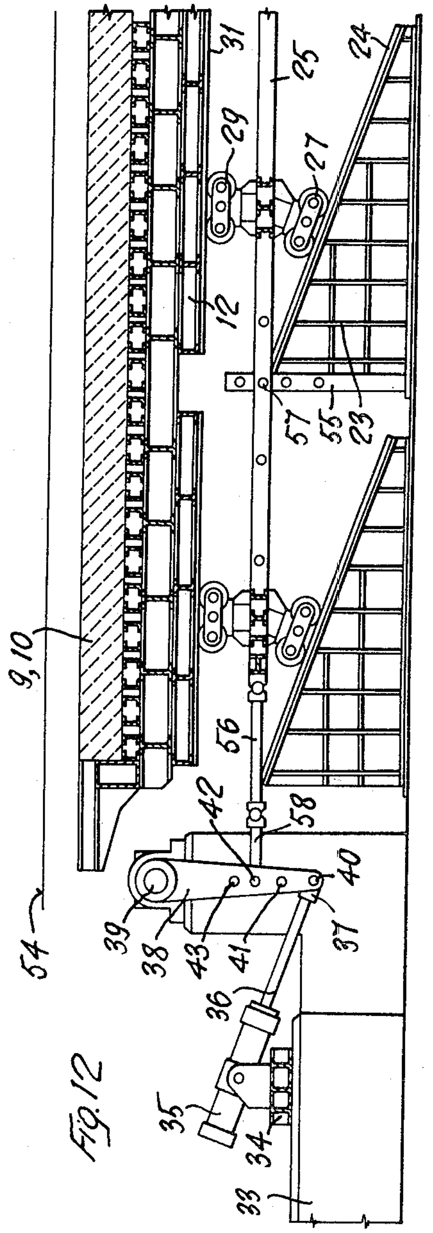
FIG. 12 the walking beam after the second depression stage.

From the position shown in FIG. 11, the lifting rod 25 is moved a further distance obliquely downwards, on the track 24 of the ramp 23, by renewed extension of the piston rod 36. This position is shown in FIG. 12. In this position, the extension 58 is disconnected from the bearing 42 in the same manner as previously took place in the position according to FIG. 10. Thereafter the piston rod 36 is retracted and the extension 58 is joined to another extension 59, the left-hand end of which is inserted into the bearing 41 of the perforated arm 31. This position is shown in FIG. 13.

Figure 13:
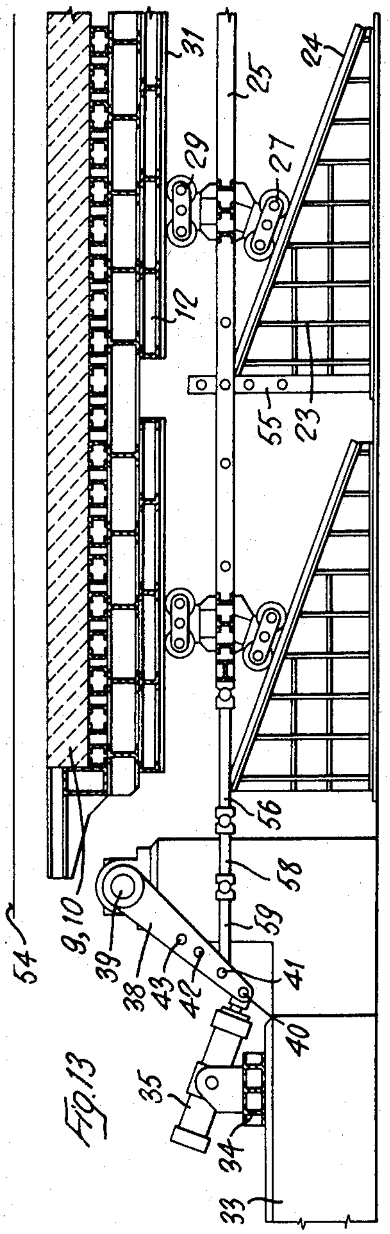
FIG. 13 conditions as per FIG. 12, however with the lifting rod extended and with its point of insertion altered.
Figure 14:
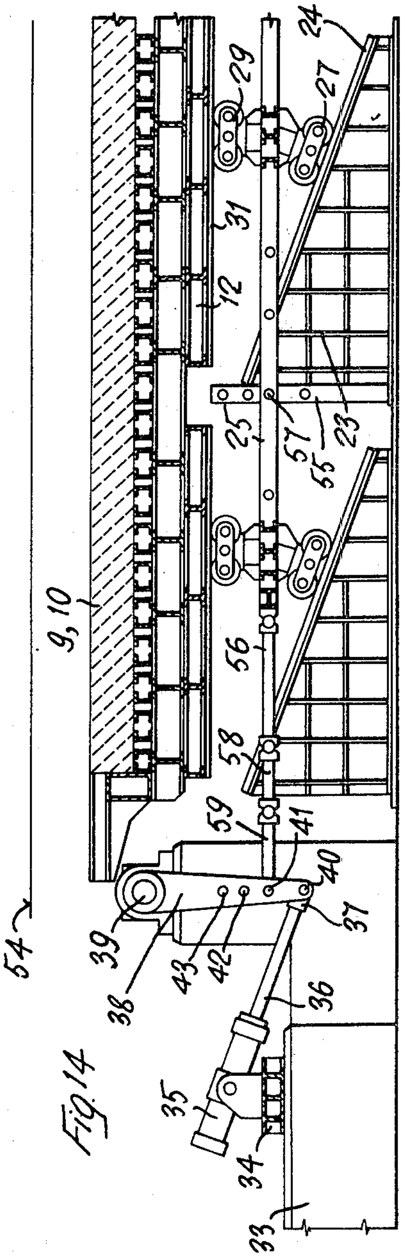
FIG. 14 the walking beam after the third depression stage.
Figure 15:
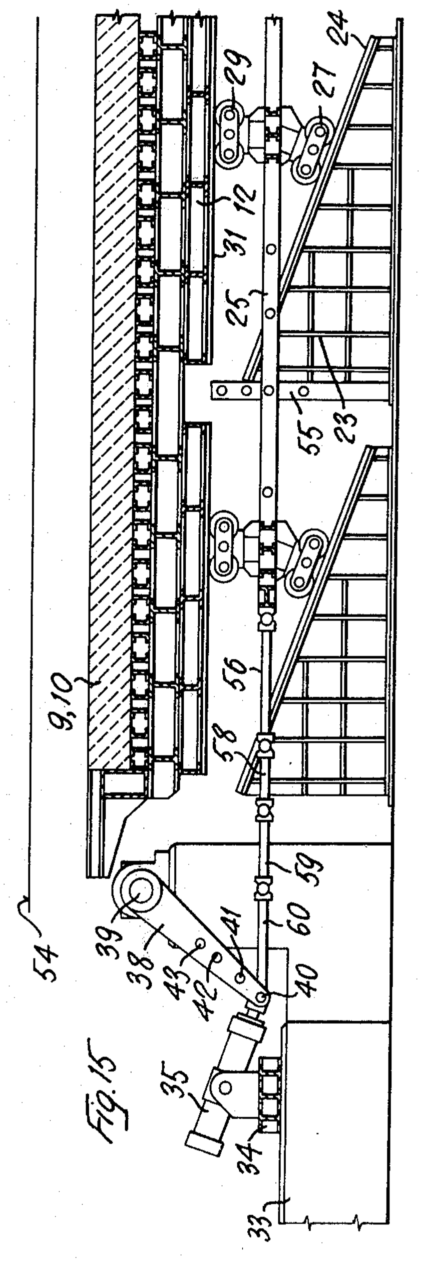
FIG. 15 conditions as per FIG. 4, however with the lifting rod extended and with its point of insertion altered, and FIG. 16 the walking beams in the repair and maintenance position (compare FIG. 8).

From the position according to FIG. 13, the piston rod 36 is extended once again, whereby the rollers 27 are once again moved a distance obliquely downwards on the track 24 of the ramp 23. In this position, the lifting rod 25 is secured to the post 55, as already described. At this point, the extension 59 can again be detached from the bearing 41 and the piston rod 36 retracted. Thereafter, a third extension 60 is joined by its end to the extension 59 and, at its other end, inserted into the bearing 40. This position is shown in FIG. 15. From this position, the walking beams 9 and 10 are depressed into their lowest position by a final extension of the piston rod 36, that is to say, into the lower repair and maintenance position shown in FIG. 8.

Figure 16:
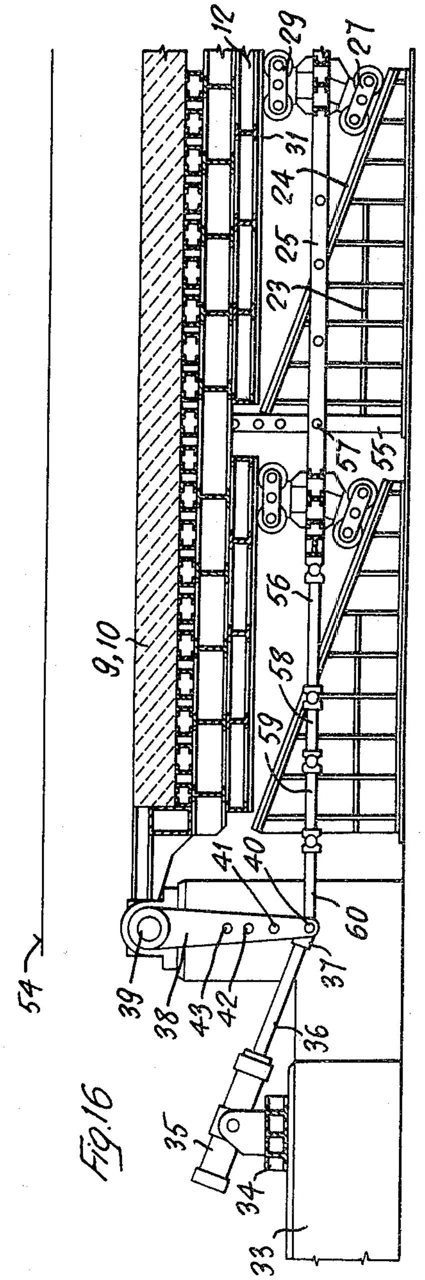

From the lower repair and maintenance position shown in FIG. 16, the walking beams 9 and 10 are driven up into the lower and upper transport-positions, shown in FIGS. 4 and 5 or FIGS. 9 and 10 respectively, in reverse sequence to that described above for depressing the beams.

We claim:

1. In a walking beam furnace, of the type which includes a ramp, having a vertical component, along which a carriage moves to raise or lower a walking beam from a hearth plane a working lift distance to move an object through said furnace, said hearth plane being defined by a fixed beam, the improvement wherein:

said ramp has a vertical component greater than the working lift of the said walking beam, whereby said walking beam may be moved to a repair and maintenance plane which is vertically spaced from said hearth plane by an amount appreciably greater than said working lift, adequate to gain maintenance acess to said beams, by moving said carriage along said ramp.

2. The walking beam furnace of claim 1 wherein said ramp has a vertical component such that when said carriage is at the bottom of said ramp the top of said walking beam lies in a plane which is below a plane containing the bottom of said fixed beams.

3. The walking beam furnace of claim 1 or 2 wherein the improvement further comprises an actuating means for producing linear movement, means connecting said actuating means to said carriage, extension means for extending the length of said connecting means, means for holding said carriage at a plurality of positions along said ramp, whereby said carriage may be moved along said ramp with successive strokes of said actuating means.

4. The walking beam furnace of claim 1 or 2, wherein the improvement further comprises:

an actuating cylinder connected to a pivotally mounted perforated arm;

a lifting rod which connects said pivotally mounted perforated arm to said carriage;

at least one extension means for said lifting rod; and means for holding said carriage at a position along said ramp;

whereby said carriage may be moved along said ramp in successive stages by operating said actuating cylinder, by holding said carriage at a location on said ramp and by attaching said at least one extension means to said lifting rod; and whereby the location of attachment of said lifting rod to said pivotally mounted perforated arm may be altered by attaching said lifting rod to any one of said perforations.

5. The walking beam furnace of claim 4 wherein the means for holding said carriage at a position along said ramp comprises a fixed post and means to temporarily attach said fixed post to said lifting rod.

6. The walking beam furnace of claim 4 wherein said actuating cylinder is connected to the free end of said pivotally mounted perforated arm, and said lifting rod is connected to said pivotally mounted perforated arm between said free end and the end which has the pivotal mount.

7. A method for maintenance of beams in a walking beam furnace having a fixed beam which lies in a hearth plane and a walking beam which moves transverse to said fixed beam by a normal working distance to move objects along said hearth plane, comprising:

moving said walking beam traverse to said hearth plane to a maintenance plane spaced from said hearth plane by an amount appreciably greater than said normal working distance while said fixed beam remains in said hearth plane, and performing maintenance of the fixed or walking beam when said walking beam lies in said maintenance plane.

8. A method for moving a carriage supporting a walking beam along a ramp in a walking beam furnace comprising:

attaching an actuating cylinder to a pivotally mounted arm;

connecting said pivotally mounted arm to a lifting rod and connecting said lifting rod to said carriage;

rotating said pivotally mounted arm from a first angular position to a second angular position by means of said actuating cylinder, thereby moving said carriage along said ramp to a first ramp position;

temporarily fixing said carriage at said first ramp position;

rotating said arm from said second angular position to said first angular position;

inserting an extension rod into said lifting rod;

releasing said carriage and rotating said arm by said actuating cylinder thereby moving said carriage to a second ramp position.

* * * * *